(12) United States Patent
Huberman

(10) Patent No.: US 10,587,988 B1
(45) Date of Patent: Mar. 10, 2020

(54) METHOD AND SYSTEM OF MOBILE DEVICE SEQUENCING FOR LOCALIZATION

(71) Applicant: MAPSTED CORP., Mississauga (CA)

(72) Inventor: Sean Huberman, Guelph (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/354,554

(22) Filed: Mar. 15, 2019

(51) Int. Cl.
*H04W 4/029* (2018.01)
*H04W 4/024* (2018.01)
*H04W 4/33* (2018.01)

(52) U.S. Cl.
CPC .......... *H04W 4/029* (2018.02); *H04W 4/024* (2018.02); *H04W 4/33* (2018.02)

(58) Field of Classification Search
CPC ........ H04W 4/029; H04W 4/024; H04W 4/33
See application file for complete search history.

(56) References Cited

U.S. PATENT DOCUMENTS

| | | | |
|---|---|---|---|
| 9,551,561 B2 * | 1/2017 | Kochanski | G01B 7/004 |
| 9,933,508 B2 * | 4/2018 | Haverinen | G01S 5/0257 |
| 10,142,794 B1 * | 11/2018 | Diamanti | H04W 12/08 |
| 2006/0075131 A1 | 4/2006 | Douglas et al. | |
| 2009/0043504 A1 | 2/2009 | Bandyopadhyay et al. | |
| 2016/0379074 A1 | 12/2016 | Nielsen et al. | |
| 2017/0339526 A9 | 11/2017 | Narasimha et al. | |
| 2018/0348351 A1 * | 12/2018 | Kuang | H04W 64/00 |

* cited by examiner

*Primary Examiner* — Joshua L Schwartz
(74) *Attorney, Agent, or Firm* — Henry L. Ohab

(57) ABSTRACT

A method and a device for localizing mobile devices are described. In an example, a first mobile device and at least a second mobile device of a plurality of mobile devices along a sequence of positions in an indoor route may be localized. Based on one or more sequencing criteria, the at least a second mobile device may be selected for an enhanced channel transmission associated with a received wireless signal. Further, from the at least a second mobile device, corresponding localization data based on the enhanced channel transmission may be received.

16 Claims, 4 Drawing Sheets

400

```
┌─────────────────────────────────────────────────────────────────────────┐
│ LOCALIZE A FIRST MOBILE DEVICE AND AT LEAST A SECOND MOBILE DEVICE      │
│ OF A PLURALITY OF MOBILE DEVICES ALONG A SEQUENCE OF POSITIONS IN       │
│                           AN INDOOR ROUTE                               │
│                                 410                                     │
└─────────────────────────────────────────────────────────────────────────┘
                                    │
                                    ▼
┌─────────────────────────────────────────────────────────────────────────┐
│ BASED ON ONE OR MORE SEQUENCING CRITERIA, SELECT THE AT LEAST A         │
│  SECOND MOBILE DEVICE FOR AN ENHANCED CHANNEL TRANSMISSION              │
│            ASSOCIATED WITH A RECEIVED WIRELESS SIGNAL                   │
│                                 420                                     │
└─────────────────────────────────────────────────────────────────────────┘
                                    │
                                    ▼
┌─────────────────────────────────────────────────────────────────────────┐
│ RECEIVE, FROM THE AT LEAST A SECOND MOBILE DEVICE, CORRESPONDING        │
│   LOCALIZATION DATA BASED ON THE ENHANCED CHANNEL TRANSMISSION          │
│                                 430                                     │
└─────────────────────────────────────────────────────────────────────────┘
```

FIG. 4

METHOD AND SYSTEM OF MOBILE DEVICE SEQUENCING FOR LOCALIZATION

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data to localize pedestrian users in possession of such a mobile device. Thus, accuracy of a determined positions primarily relies on quality of data, sensor or signal, being used for position estimation.

BRIEF DESCRIPTION OF THE DRAWINGS

FIG. 4 in an example embodiment, a method of mobile device sequencing for localization.

DETAILED DESCRIPTION

Figure 1:
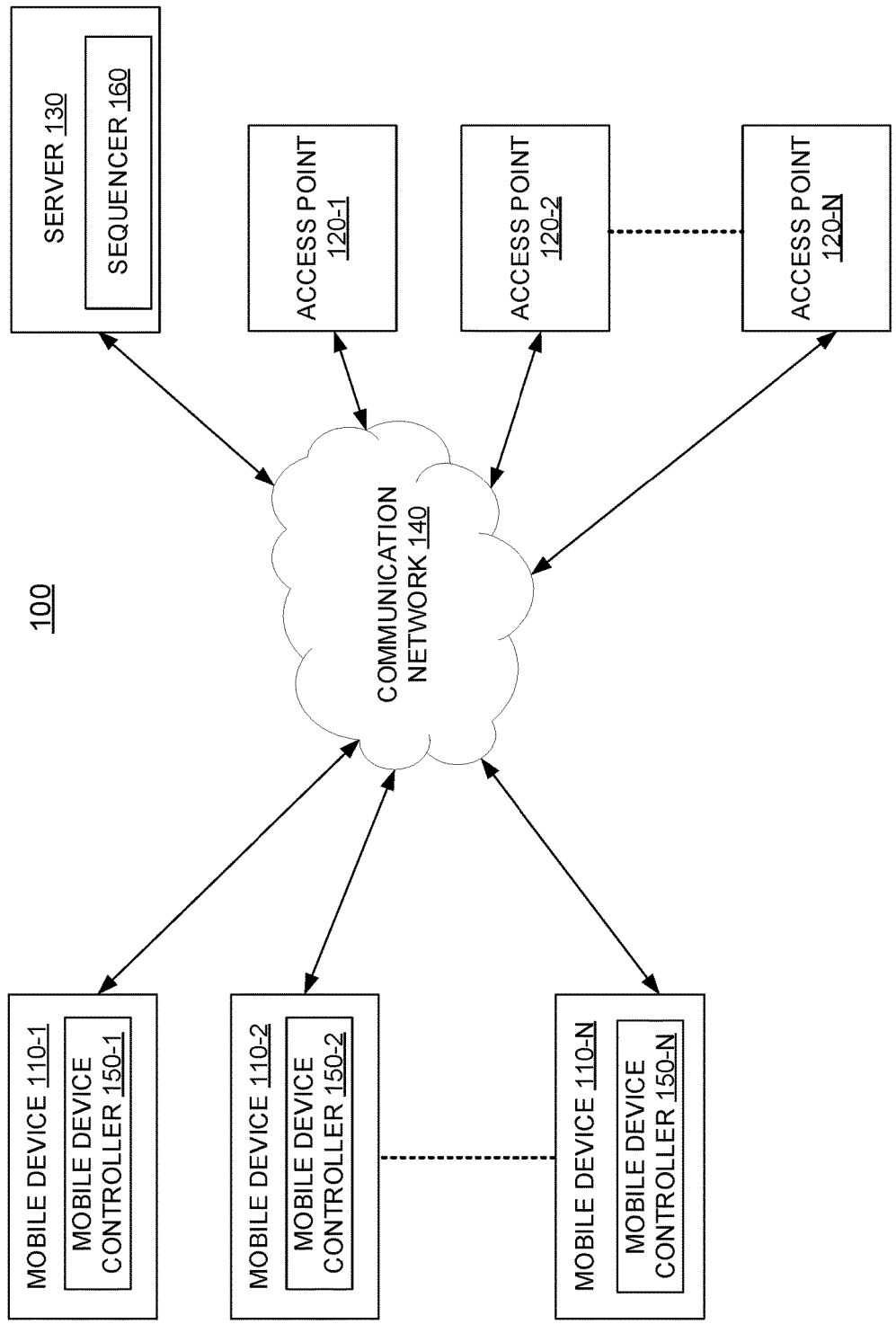
FIG. 1 illustrates, in an example embodiment, a network environment for localizing mobile devices in a pedestrian area.

Among other benefits and technical effects, embodiments provided herein provide for efficiently and accurately determining locations of mobile devices in a pedestrian area, such as indoors, by sequencing mobile device for enhanced channel transmission. The enhanced channel transmission associated with a received wireless signal may aid in better quality signal data, which may enhance the accuracy of localization performed. In an example, the sequencing may be performed to favor the mobile devices with weaker location estimates to allow them a better opportunity to infer their current location and increase associated confidence level; and at the same time to periodically favor the mobile devices with stronger location estimates so that they maintain the strong location estimates.

Generally, inertial sensor data and/or signal data may be used for location estimation inside a pedestrian area. The signal data may include, for instance, data pertaining to wireless channel parameters, such as CSI parameters or received signal strength (RSS). RSS may be understood as a measurement of power present in a received radio signal and channel state information (CSI) channel parameters provide a measure of how a signal propagates in an environment. The estimated CSI and the measured RSS may be used for determining distance estimates for localization. Better a communication link or communication channel between an access point (i.e., source of the signal) and a mobile device (i.e., a receiver), higher is the RSS. One of the challenging aspects of wireless-based indoor positioning using signal data, such as RSS data, is that such systems can measure very high variances in terms of the RSS even when the user is stationary. Available positioning systems attempt to utilize RSS measurements to infer distance from various access points and to localize based on the inferred distances. However, the high variability in RSS can result in significant distance estimation errors, and as such, poor positioning. For instance, RSS measurements may be affected by number of users in the pedestrian area, other signals being sent at the same frequency, and obstacles, such as objects, furniture, and walls, in the pedestrian area, which in turn may affect the distance computation.

As a result, localization using such RSS data may be inaccurate thereby leading to inefficient indoor navigation. This may further result in wastage of computational resources as localization may have to be performed multiple times to ensure appropriate navigation in the pedestrian area. Additionally, it may also it may also increase the latency causing larger computational delays for localizing the mobile devices. For instance, if five realizations are required before the position can be estimated with required accuracy, then the position will be estimated comparatively slowly.

The present subject matter provides an iterative mechanism for sequencing mobile device in a pedestrian area to receive enhanced channel transmission for localizing the mobile devices. The pedestrian area, in embodiments, may be an indoor area within any one of a shopping mall, a warehouse, an airport facility, a hospital facility, a university campus facility or any at least partially enclosed building. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

Embodiments herein provide a method of localizing a plurality of mobile devices. In particular, the method comprises localizing a first mobile device and at least a second mobile device of the plurality of mobile devices along a sequence of positions in an indoor route; based on one or more sequencing criteria, selecting the at least a second mobile device for an enhanced channel transmission associated with a received wireless signal; and receiving, from the at least a second mobile device, corresponding localization data based on the enhanced channel transmission. In an example, a confidence level associated with localizing each of the first mobile device and the at least a second mobile device may be estimated. In another example, at least one sequencing criteria from among the one or more sequencing criteria comprises comparing the confidence level associated with localizing the first mobile device with the confidence level associated with localizing the at least a second mobile device, and the at least a second mobile device may be selected for the enhanced channel transmission when the confidence level associated with the at least a second mobile device is lower than the confidence level associated with the first mobile device.

For the purpose of explanation and not as a limitation, a mobile device with a confidence level in a position estimate greater than a threshold confidence level may be said to have a strong position estimate, while a mobile device with the confidence level in a position estimate less than a threshold confidence level may identified as mobile devices with weak position estimate.

Also provided herein in a server computing device including a processor and a memory storing a set of computer instructions. The instructions are executable in the processor to localize a first mobile device and at least a second mobile device of the plurality of mobile devices along a sequence of positions in an indoor route; based on one or more sequencing criteria, select the at least a second mobile device for an enhanced channel transmission associated with a received wireless signal; and receive, from the at least a second mobile device, corresponding localization data based on the enhanced channel transmission.

This way, each mobile device may periodically get much higher caliber data than they would otherwise have been given access to, which allows the mobile devices to apply more robust corrections to their dynamic real-time updating. Further, using appropriate sensor fusion, each user can achieve higher-quality performance corrections/inputs leading to an overall more robust indoor positioning system for all users/mobile devices. Moreover, the present subject matter uses the available resources, thereby making it easy to implement and cost effective. Additionally, the present subject matter provides for enhancing the accuracy by controlling the network intelligently so that the processing performed by the mobile devices is not affected.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a network environment 100 for localizing mobile devices 110-1, 110-2, . . . 110-N in a pedestrian area. The mobile devices 110-1, 110-2, . . . 110-N may be collectively referred to as mobile devices 110 and individually as mobile device 110. The mobile device 110, one or more access points 120-1, 120-2, . . . 120-N, collectively referred to as access points 120, and a server computing device 130 may communicate over a communication network 140.

The communication network 140, in an example, may be a wireless communication network, such as, a telecommunication network, a cellular network, a wireless local area network (WLAN), a satellite communication based network, a near field communication based network, etc.

The server computing device 130 may be a computing device, such as a cloud server or a remote server, to manage access points and provide for accurate localization of the mobile devices 110. The access points 120-1, 120-2, . . . 120-N, collectively referred to as access points 120 and individually referred to as access point 120, may be a computing device, which may provide for various devices to connect to a network, such as a wired network of the communication network 140. The access points 140 may be spread across the pedestrian area to ensure that facility appropriately covered.

In one embodiment, the mobile device 110 may be, such as a cellular or smartphone, a laptop or a tablet computer, or a wearable computer device that may be operational for any one or more of telephony, data communication, and data computing. The mobile device 110 may include fingerprint data of the pedestrian area, such as an indoor facility and proximate pedestrian section stored in a local memory. In some examples, the mobile device 110, may download the fingerprint data from the server computing device 130, which may make the fingerprint data accessible to the mobile device 110 for download into the local memory of mobile device 110. The fingerprint data along with device data (sensor data and/or signal data) may be used for localization. The fingerprint data may include one or more of orientation data, a magnetic field data including strength and direction, received wireless signal strength data, barometric pressure data, and also GPS location data at a position within the area for respective mobile devices.

The mobile device 110 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. The mobile device 110 may also include capability for detecting and communicatively accessing ambient wireless communication signals including but not limited to any of Bluetooth® and Bluetooth Low Energy (BLE), Wi-Fi, RFID, or satellite-based navigations signals including global positioning system (GPS) signals. The mobile device 110 further includes the capability for detecting, via sensor devices, and measuring wireless signal parameters, which may include wireless signal parameters related to the ambient wireless signals, such as CSI related parameters, or received signal strength or any other parameter that is indicative of quality of a communication channel. In another example, the mobile device 110 may include location determination capability and a communication interface for communicatively coupling to communication network 140, including by sending and receiving cellular data over data and voice channels.

In an example, a mobile device controller 150 of the mobile device 110 may periodically or on receiving an input from the server computing device 130, hereinafter server 130, transmit corresponding localization data packet to the server 130. The localization data, among other things, may include localization data. The localization data may include location details, such as location coordinates in the pedestrian area or device data (signal and/or sensor) used for localization. location (x, y) coordinate information and floor number information, such as for a multi-floor building constituting the pedestrian area. Further, the localization data may also include a confidence level associated with the estimated location of the mobile device. In an example, the localization data packet may further be partitioned to include a preamble component having a company identifier or other identifier associated with either a proprietary or a standard formatting of the localization data packet, based upon which, for example, the information encoded in localization data packet may be correctly decoded into specific (x, y, z) coordinates to establish a position of mobile device 110 as localized within the pedestrian area.

The position of the mobile device 110 may be estimated either by the mobile device 110 itself, for instance, by the mobile device controller 150; or the server 130 may estimate the position of mobile device 110. In an example, based on the position estimation and one or more sequencing criteria associated with the estimated position, the server 130 may select one or more mobile devices for enhanced channel transmission associated with a received wireless signal. Thus, the server 130 may control channel transmission for managing communication channels between the access points 120 and the mobile devices 110. In an example, at least one sequencing criteria from among the one or more sequencing criteria may be based on a confidence level associated with estimated positions of the mobile devices.

For instance, within the network environment 100, there may be some users whose locations may well-estimated (i.e., a confidence level greater than a threshold/strong position estimates), whereas there may be others whose locations may be poorly-estimated (i.e., a confidence level less than a threshold/weak position estimates). In an example, a sequencer 160 of the server 130 may periodically provide inputs to the access point(s) 120 for dynamically adjusting the beamforming to instantaneously favor the weaker users, thus allowing them a better opportunity to infer their current location and increase their confidence. The beamforming may include, for instance, focusing a transmitted signal in a direction of a selected mobile device 110.

The sequencer 160 may also factor in other aspects, which may be included in the sequencing criteria, such as a user motion, where if a user/mobile device is stationary and its location is known with a high confidence, the sequencing criteria may indicate that the user need not be prioritized in the sequencing for enhanced channel transmission. Similarly, when a confidence level associated with a set of mobile devices in a cluster is greater than a threshold or other clusters, the mobile devices in such a cluster may be prioritized as explained in further detail with respect to description of FIG. 2. In another example, a user profile may indicate a premium user, and such a premium user may be prioritized for enhanced channel transmission. The premium user may be a user which is part of a loyalty program and benefits from such a loyalty program. Thus, sequencing criteria may specify various attributes based on which sequencing for enhanced channel transmission may be performed. The attributes (confidence level, user motion, user profile, etc.) may also have a weight associated them and a mobile device with maximum weight, based on the sequencing criteria may be selected.

Upon selection of the mobile devices 110 which are due enhanced channel transmission, the server 130 may provide an input to one more access points 120 to perform beamforming, such as multi-stage beamforming to improve quality of communication channel corresponding to identified mobile devices. The process may be repeated periodically, for instance, the sequencing criteria may also define when to identify next mobile device. Further, in an example, on a periodic basis, the quality of communication channel for the mobile devices with strong position estimates may be maintained to ensure that they maintain a strong location estimation.

Using better signal data, owing to improved channels, which are now available, along with other data sources, such as inertial sensors and magnetic field, the selected mobile device(s) 110 may be able to better estimate their current locations, thereby enhancing accuracy of the indoor navigation. This way, the mobile devices 110 with weak location estimates may now be able to accurately determine their position.

In yet another example, other peer mobile devices 110 that are in a generally known proximate range based on transmission range inherent to a given signal type, such as a Bluetooth Low Energy (BLE) signal type, from the broadcasting mobile device may optionally use the broadcasted location data, as received, to establish their respective positions, or to confirm their respective positions with an increased degree of certainty. Thus, in addition to enhanced channel that may now be available owing to sequencing, the mobile devices 110 may also use location data broadcasted by other mobile devices 110 to increase the accuracy of determining their own position, based on the confidence associated with the position estimation of the broadcasting mobile device. More specifically, the mobile devices 110 may broadcast their known positions to other mobile devices 110 within the crowd of peer mobile devices. For instance, a mobile device 110, say mobile device 110-1 within the pedestrian area may receive the localization data broadcast by another mobile device mobile device 110-2, and may use the localization information as received from mobile device 110-2 to confirm its position as localized. For instance, based on data pertaining to signal received from the peer mobile device 110-2, such as signal strength or other parameters, the mobile device 110-1 may estimate a distance from the peer mobile device 110-2; and then based on the distance from the peer mobile device 110-2, the location of the peer mobile device 110-2, along with other signal/sensor data, the position of the mobile device 110-1 may be determined.

Thus, using the present subject matter, the mobile devices 110 periodically receive much higher quality data inputs, whereas previously the mobile devices 110 only got data points based on traditionally determined signal space. In an example, by focusing the signals or using targeted beamforming, high-quality data can be delivered, albeit less frequently. Therefore, the mobile devices 110 may combine other data-fusion techniques, such as inertial sensor based and magnetic filed based techniques for localization.

Figure 2:
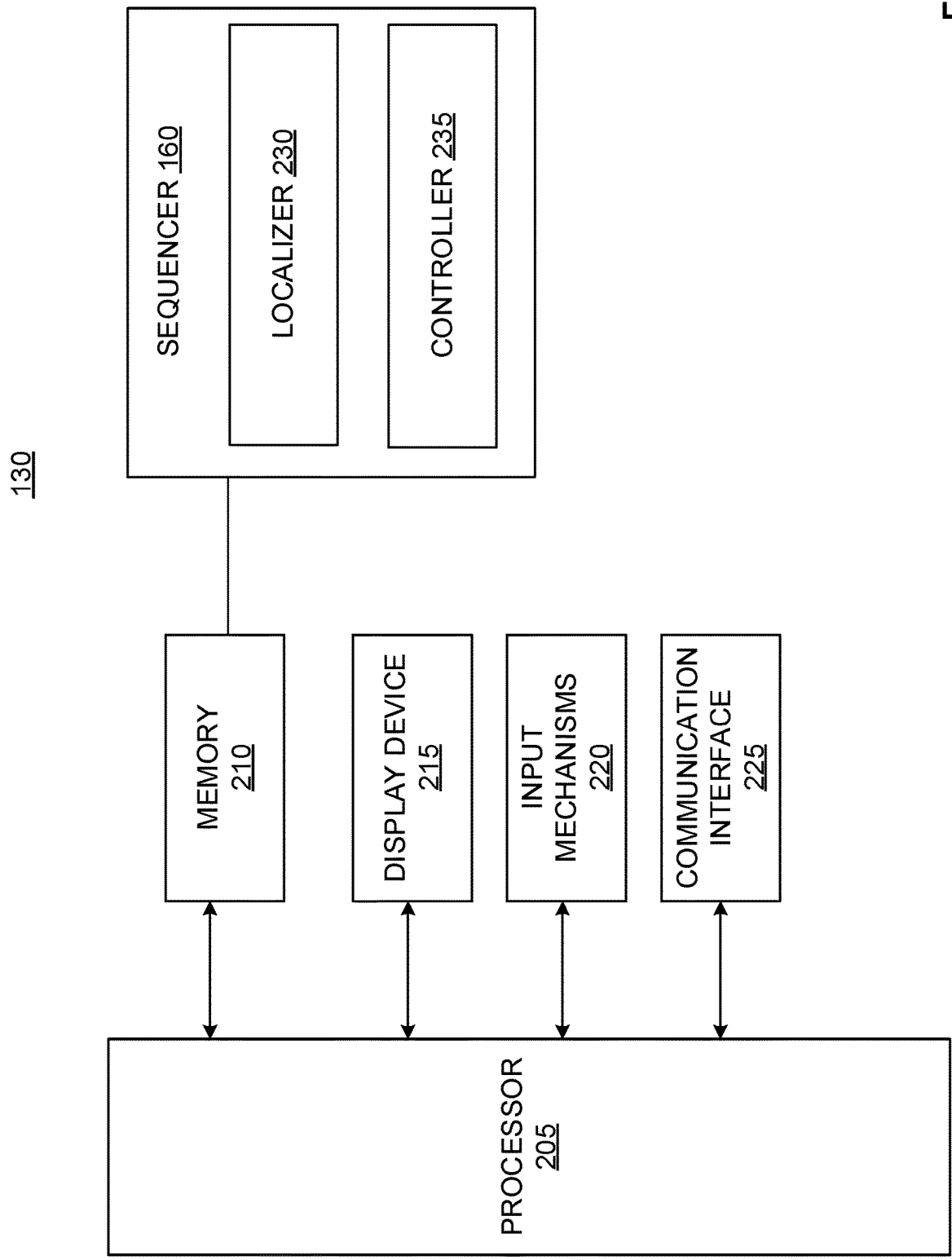
FIG. 2 illustrate an example architecture of a computer server for mobile device sequencing for localization.

FIG. 2 illustrates an example architecture of the server 130 for sequencing mobile devices 110 for localization. In an example, the server 130 provides for managing channel transmissions between the access points 120 and the mobile devices 110 in a pedestrian area for better location estimation. The server 130, in an embodiment architecture, may be implemented on one or more server devices, and includes a processor 205, memory 210 which may include a read-only memory (ROM) as well as a random access memory (RAM) or other dynamic storage device, display device 215, input mechanisms 220 and communication interface 225 for communicative coupling to communication network 104. The processor 205 is configured with software and/or other logic (such as the sequencer 160) to perform one or more processes, steps and other functions described with implementations, such as described by FIGS. 1, 2 and 4 herein. The processor 205 may process information and instructions stored in the memory 210, such as provided by a random access memory (RAM) or other dynamic storage device, for storing information and instructions which are executable by the processor 205. The memory 210 also may be used for storing temporary variables or other intermediate information during execution of instructions to be executed by the processor 205. The memory 210 may also include the ROM or other static storage device for storing static information and instructions for processor 205; a storage device, such as a magnetic disk or optical disk, may be provided for storing information and instructions. Communication interface 225 enables the server 130 to communicate with one or more communication networks, such as the network 140 (e.g., cellular network) through use of the network link (wireless or wired). Using the network link, the server 130 can communicate with mobile devices 110 and the access points 120.

The server 130, among other components, may include the sequencer 160. The sequencer 160 may include processor-executable instructions stored in RAM, in one embodiment, in the memory 210 and may include sub-modules, such as a localizer 230 and a controller 235. In an example, the server 130 may also include a fingerprint data repository (not shown in figures), which may be communicatively accessible to mobile device 110, via the network 140. In alternate embodiments, the fingerprint data repository, or any portion(s) thereof, may be stored in a memory of mobile device 110.

The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device 110, the value or pattern as detected may be matched to a reference fingerprint stored in a fingerprint map of a given facility, for example as stored in positioning fingerprint data repository, to identify the unique position of the mobile device relative to the facility, a process also referred to herein as localization.

A sequence of positions or locations that constitute a navigation path traversed by mobile device 110 relative to the pedestrian area may be mapped for fingerprint data during a fingerprint calibration process. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. The fingerprint data may be used to track the mobile device 110 traversal along an indoor route within, and even adjoining, the pedestrian area.

The mobile device wireless signal data including signal strength and connectivity, inertial data, barometric data, magnetic data and other device data may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data.

In an example to perform mobile device sequencing for enhanced channel transmission, the mobile devices 110 may broadcast the localization data packets, which may be received by the sequencer 160. The localization data packet may include the localization data and optionally, a confidence level associated with the estimated position. The localization data packet may also include confidence level associated with an estimated position of the corresponding mobile device. The localizer 230 may use the localization data to localize the mobile device 110 in the pedestrian area. In case the localization data includes the location coordination, the localizer 230 may identify the location coordinates as an estimated position of the mobile device 110. In case the mobile device 110 shares data, such as device signal data and device sensor data, the localizer 230 may determine the estimated position of the mobile device 110 in the pedestrian area.

For determining the position, the localizer 230 may fuse the device signal data, the device sensor data, and other relevant data with the fingerprint localization data as described above. The device sensor data can include accelerometer information, atmospheric pressure information, gyroscope information, magnetometer information, and any other sensor data available to the mobile device 110. The device signal data can include Wi-Fi signals, Bluetooth signals, Cellular signals, RSS data/CSI related data, and any other signal data available to and measurable by the mobile device 110. Based on the device signal data and the device sensor data along with the fingerprint data, one or more potential locations of the mobile device 110 in the pedestrian area may be estimated.

In another example, the mobile device 110 may include a module implementing the functionalities of the localizer to perform the localization using the device signal data, the device sensor, and the fingerprint data, as explained above.

The device position, estimated position, and localization refer to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms.

In an example, as the accuracy associated with estimating the position, or location, of the mobile device 110 as a consequence of localization is not absolute, but rather is subject to the statistical, or probabilistic, nature of the fingerprint parameters, including but not limited to the inherently probabilistic nature of wireless radio frequency signal parameters as received, a confidence level associated with the estimated location may also be determined. In case the localization data does not include the confidence level, the localizer 230 may determine the confidence level as well. The localizer 230 may implement a weighted trilateration scheme, which can provide both an estimated location and a standard deviation (confidence level). The standard deviation may provide for combining the instantaneous data with historical data to better refine the location estimate.

As a measure of the accuracy of localization of mobile device 110, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = \frac{1}{N-1} \sum (x - \mu_x)^2$$

$$\sigma_y^2 = \frac{1}{N-1} \sum (y - \mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position may also have a probabilistic estimate expressed as a confidence level.

The controller 235 may receive the location details to sequence the mobile devices 110 for localization. In an example, from the localization data pertaining to the mobile devices 110 in the pedestrian area, the controller 235 may identify one or more mobile devices 110, which may be due for enhanced communication channels. The controller 235 may implement a sequencing criteria for identifying the candidates for receiving enhanced channel transmissions. In an example, the sequencing criteria may facilitate selection of the candidate mobile device based on a confidence level associated with an estimated position of the mobile device 110. For instance, a mobile device 110 with the confidence level less than a threshold confidence level may be identified as a candidate. In one embodiment, the threshold confidence level may be established using a range of from 60 to 90 percent. In other examples, the mobile device 110 with least confidence level associated with the estimated position may be identified. Thus, the confidence levels associated with the associated positions aid in determining the mobile devices 110 which may not have been localized accurately.

In other examples, the sequencing criteria may factor in various other attributes as well, such as clustering of the plurality of the mobile devices 110 based on corresponding estimated positions, time elapsed since the channel was last updated for a mobile device, a motion state of the at least one mobile device, and a user profile, wireless signal parameters associated with the at least one mobile device.

In an example, the controller 235 may cluster the mobile devices 110 into multiple groups/clusters in the pedestrian area, based on their position estimates. For instance, the mobile devices 110 in predefined proximity to each other may be grouped in one cluster. Alternatively, cluster areas may be predefined, and based on the location estimated of the mobile device 110, a corresponding cluster may be identified. In such case, a set of mobile devices 110 may identified as candidates for enhanced wireless channel. For instance, the cluster with a maximum number of mobile devices 110 may be selected. In another example, the cluster with least confidence level may be selected.

In another example, a mobile device 110, which has not been provided usual or enhanced channel for more than a predetermined time period may be selected. Thus, the controller 235 may consider a length of time since a mobile device has received updated channel transmission or the enhanced channel transmission.

In yet another example, the selection may be based on a motion state of the mobile device, the motion state being indicative of whether the mobile device is in motion or the mobile device is stationary. In said example, a mobile device 110, which is stationary may not be prioritized for enhanced channel transmission. The controller 235, based on the sensor data, for instance, inertial data, which can provide information about the relative movements of the mobile device 110, may ascertain whether the mobile device 110 is stationary. When stationary for a predetermined time-period, the motion state of the mobile device 110 may be identified as stationary.

In another example, a mobile device 110 having channel parameters less than a threshold value may be prioritized. The wireless signal parameters, such as CSI parameters and/or RSS are indicative factors associated with propagation of a signal in an environment and hence, the quality of the channel.

It will be appreciated that the sequencing criteria may be based on one or more of the above-mentioned factors. For instance, if a user is stationary and their location is known with high confidence, they do not need to be prioritized for enhanced channel transmission. Further, a weight may be associated with each of the factors to identify the mobile device(s) due for sequencing. For instance, the confidence level may have a highest weight and based on the type sequencing required, other factors may be assigned appropriate weights. For instance, in certain cases the user profile may be provided highest weight or in another case a cluster may be provided a highest weight and so forth. Based on an overall weight computed for a mobile device 110, a candidate for sequencing may be selected by the controller 235.

Upon selection of the mobile device(s) 110 due for enhanced channel transmission, i.e., enhanced channel, the controller 235 may provide an input to the access points 120 to enhance the channel transmission. For instance, the controller 235 define an objective for multi-stage beamforming implemented by the access points 120 for enhancing the accuracy of location estimates for these mobile devices 110, the objective being indicative of the candidate mobile device(s) 110. Beamforming may be understood as "directing" the wireless channel/signals in a calculated direction (i.e., beam) with the intention of enhancing the channel conditions for a particular user (e.g., increasing the line-of-sight). The Line-of-Sight (LOS) based channel propagation experiences significantly less multi-path fading, which results in a much more consistent received signal (i.e., much lower variance). Therefore, when used to enhance channel for a particular mobile device 110, inferring distance from the access point 120 can be done much more accurately, leading to much more robust position estimation.

As mentioned above, the network environment 100 may include multiple access points 120 and multiple mobile devices 110. So, to enhance channel of one or more mobile devices 110 for better position estimation, the controller 235 may provide input(s) to the access points 120 to focus the transmitted signals in the direction of the candidate mobile devices 110, based on the localization of the mobile devices 110. As a result, with higher-quality signals, the selected mobile devices 110 can better estimate their current locations.

Further, in order to ensure that, the other mobile devices 110 are not unduly affected, the sequencing criteria may periodically rotate among the various mobile devices 110. For instance, the sequencing criteria may include an attribute to monitor the time period for each sequencing cycle. The time period for a sequencing cycle may be predefined or may be configurable. On lapse of the time period, the next sequencing cycle may initiate and other candidate mobile devices 110 for may be selected for enhanced channel transmission. While selecting the candidates, the controller 235 may after a predetermined number of sequencing cycles, may select the candidate mobile devices 110 with stronger confidence to ensure such mobile devices 110 still have strong confidence in corresponding position estimates and other mobile devices 110 are not adversely affected. Thus, even though certain mobile devices 110 have stronger/higher confidence, they may still be selected for sequencing. Alternatively, upon predetermined sequencing cycles, the server 130 may resume usual channel estimation.

Figure 3:
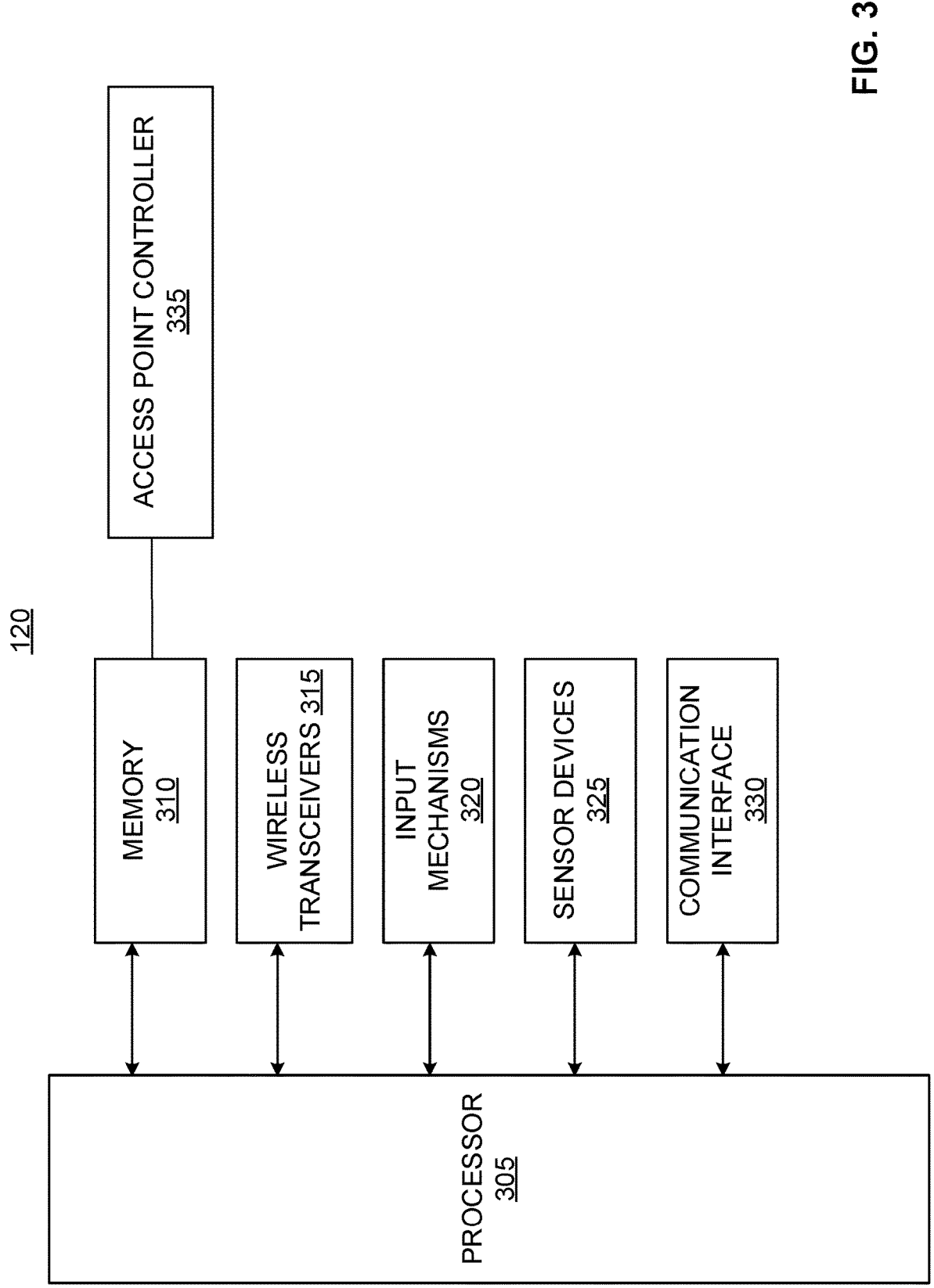
FIG. 3 illustrate an example architecture of an access point for mobile device sequencing for localization.

FIG. 3 illustrates, in an example embodiment, the access point 120. The access point 120 may communicate with the mobile devices 110 and the server 130. The access point 120 may include processor(s) 305, memory 310, wireless transceivers 315, input mechanisms 320, such as, such as a keypad or software-implemented touchscreen input functionality, barcode, QR code or other symbol- or code-scanner input functionality, sensor devices 325, and a communication interface 330. The wireless transceivers 315 may include, for example, global navigation satellite system (GNSS) and short range wireless (SRW) transceivers, such as Bluetooth transceiver or Wi-Fi transceiver. In other examples, other transceivers, such as cellular transceivers may be also implemented. The sensor devices 325 may include barometric or other environmental pressure sensing functionality and temperature sensors.

The access point 120, among other components, may include an access point controller 335. The access point controller 335 may include processor-executable instructions stored in RAM, in one embodiment, in the memory 310. To communicate, the access points 120 may broadcast pilot signals to each-other. For broadcasting, server-side time-based synchronization is utilized to ensure simultaneous periodical transmission/reception intervals.

In an example, the access point 120 may perform channel estimation and implement multi-stage beamforming for transmission and reception of wireless signals. The beamforming may be performed, based on the inputs received from the server 130. In one example, the input may indicate the mobile device(s) 110, which are due for enhanced channel transmission. The access point controller 335 may implement techniques, such as Least Mean Squares, Recursive Least Squares, Sample Matrix Inversion, Conjugate Gradient Method, Dirty Paper Coding, Vector Perturbation Precoding, Zero-Forcing Precoding, Minimum Mean Squared Error Precoding, Maximum Ratio Transmission Precoding, Opportunistic Beamforming, Linear and Non-Linear Precoding, to perform computations regarding focusing of the transmitted signals to the selected mobile devices 110. In another example, the computations may be performed or using the server 130.

The access point controller 335 may provide for transmitting the signals such that signals from the corresponding access point 120 are directed to one or more selected mobile devices 110. Thus, the access points 120 may perform the beamforming in a manner to increase accuracy of position estimation by the mobile devices 110.

Due to better quality signal data, the mobile device 110 will gain a stronger signal as compared to previously (i.e., more closely related to line-of-sight) and therefore the mobile device localization can be performed with high accuracy. For example, when multiple access points 120 simultaneously "benefit" one mobile device, that use will obtain more representative data (i.e., lower variance RSS), which can allow the mobile device 110 to self-optimize more accurately (e.g., higher quality RSS leads to better quality wireless location accuracy. Thus, each user's location can be dynamically updated either locally or centrally using improved signal data.

Methodology

FIG. 4 illustrates, in an example embodiment, a method 400 of localizing a plurality of mobile devices in a pedestrian area. In describing examples of FIG. 4, reference is made to the examples of FIGS. 1-3 for purposes of illustrating suitable components or elements for performing a step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4, examples of method steps described herein are related to a server computing device, such as server 130, to facilitate accurate localization of the mobile devices 110. According to one embodiment, the techniques are performed the processor 205 executing one or more sequences of software logic instructions that constitute the sequencer 160 of the server 130. In embodiments, the sequencer 160 may include the one or more sequences of instructions within sub-modules including the localizer 230 and the controller 235. Such instructions may be read into the memory 210 from machine-readable medium, such as memory storage devices. Execution of the sequences of instructions contained in the sequencer 160 in the memory 210 causes the processor 205 to perform the process steps described herein. It is contemplated that, in some implementations, some of the sub-modules, or any other portions of executable instructions constituting the sequencer 160 may be hosted at a remote device rather than the server 130. In alternative implementations, at least some hard-wired circuitry may be used in place of, or in combination with, the software logic instructions to implement examples described herein. Thus, the examples described herein are not limited to any particular combination of hardware circuitry and software instructions.

At block 410, a first mobile device and at least a second mobile device of the plurality of mobile devices 110 may be localized along a sequence of positions in an indoor route. For instance, localization data packet may be received from the first mobile device and the at least a second mobile device. The localization data packet, in an example, may include among other things, position estimates of a corresponding mobile device and/or data required for localization, such as sensor data and signal data, corresponding to the mobile device 110. In another example, localizing comprises a coordinate location having a probabilistic estimate expressed as a confidence level and the localization data packet may also include a confidence level associated with the position estimate of the mobile devices. The confidence level being indicative of accuracy of the estimated position.

At block 420, based on one or more sequencing criteria, the second mobile device may be selected for an enhanced channel transmission associated with a received wireless signal. In an example, a confidence level associated with localizing each of the first mobile device and the second mobile device may be estimated. Further, at least one sequencing criteria from among the one or more sequencing criteria comprises comparing the confidence level associated with localizing the first mobile device with the confidence level associated with localizing the at least a second mobile device, and the second mobile device is selected for the enhanced channel transmission when the confidence level associated with the second mobile device is lower than the confidence level associated with the first mobile device.

In another example, at least one sequencing criteria from among the one or more sequencing criteria may be based on at least one of clustering of the plurality of the mobile devices 110 based on a location coordinate of each of the plurality of mobile devices 110, receipt of a last update from the at least a second mobile device, a motion state of the at least a second mobile device, a user profile associated with the second mobile device and wireless signal parameters associated with the at least a second mobile device.

In another example, a set of mobile devices from among the plurality devices may be identified for the enhanced channel transmission, the set of mobile devices including the at least a second mobile device. The identifying may include clustering the plurality of mobile device 110 into a plurality of clusters based on a position estimate of each of the plurality of mobile devices 110 and selecting a cluster including the set of mobile devices, based on the one or more sequencing criteria, where at least one sequencing criteria from among the one or more sequencing criteria is based on at least one of a number of mobile devices 110 in the cluster, the quality of channel associated with the number of the mobile devices 110 in the cluster, and a confidence level associated with cluster. The confidence level of the cluster may be based on the confidence level of each of the mobile devices 110 in the cluster.

At block 430, from the second mobile device corresponding localization data based on the enhanced channel transmission ma be received. In an example, an input to enhance channel transmission for the second mobile device may be provided to an access point device. Further, enhancing the channel transmission comprises focusing a wireless signal in a direction of the at least a second mobile device, based on the localizing of the at least a second mobile device. The second mobile device or the server, upon enhancing of the channel transmission, may perform location estimation using the enhanced wireless channel to increase confidence level associated with the estimated position of the at least mobile device. In an example, using the present subject matter, the mobile devices 110 periodically receive much higher quality data inputs, whereas previously the mobile devices 110 only got data points based on traditionally determined signal space. In an example, by focusing the signals or using targeted beamforming, high-quality data can be delivered, albeit less frequently. Therefore, the mobile devices 110 may combine other data-fusion techniques, such as inertial sensor based and magnetic filed based techniques for localization.

In an example, in a subsequent sequencing cycle, the first mobile device is selected for the enhanced channel transmission. Further, the subsequent sequencing cycle is identified based on at least one of lapse of a predetermined number of sequencing cycles, a predefined time-period, and the confidence level associated with the first mobile device being less than the threshold confidence level.

Thus, in an example, the network in the pedestrian area may be controlled so as to enhance channel transmissions in a manner that the mobile devices with weaker position estimates are favored and the accuracy is position estimation is enhanced, while at the same ensuring that the accuracy of the mobile devices with stronger position estimates is not adversely affected.

At It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of localizing a plurality of mobile devices comprising:
    localizing a first mobile device and at least a second mobile device of the plurality of mobile devices along a sequence of positions in an indoor route;
    based on one or more sequencing criteria, selecting the at least a second mobile device for an enhanced channel transmission associated with a received wireless signal; and
    receiving, from the at least a second mobile device, corresponding localization data based on the enhanced channel transmission,
    estimating a confidence level associated with localizing each of the first mobile device and the at least a second mobile device, wherein at least one sequencing criteria from among the one or more sequencing criteria comprises comparing the confidence level associated with localizing the first mobile device with the confidence level associated with localizing the at least a second mobile device, and wherein the at least a second mobile device is selected for the enhanced channel transmission when the confidence level associated with the at least a second mobile device is lower than the confidence level associated with the first mobile device.

2. The method of claim 1, wherein at least one sequencing criteria from among the one or more sequencing criteria is based on at least one of clustering of the plurality of the mobile devices based on a location coordinate of each of the plurality of mobile devices, receipt of a last update from the at least a second mobile device, a motion state of the at least a second mobile device, a user profile associated with the at least a second mobile device and wireless signal parameters associated with the at least a second mobile device.

3. The method of claim 1 further comprising providing an input to enhance channel transmission for the at least a second mobile device, wherein enhancing the channel transmission comprises focusing a wireless signal in a direction of the at least a second mobile device, based on the localizing of the at least a second mobile device.

4. The method of claim 1 further comprising, in a subsequent sequencing cycle, selecting the first mobile device for the enhanced channel transmission.

5. The method of claim 4 further comprising identifying the subsequent sequencing cycle based on at least one of lapse of a predetermined number of sequencing cycles, a predefined time-period, and the confidence level associated with the first mobile device being less than the threshold confidence level.

6. The method of claim 1 further comprising identifying a set of mobile devices from among the plurality devices for the enhanced channel transmission, wherein the set of mobile devices includes the at least a second mobile device, and wherein the set of mobile devices is identified by:
    clustering the plurality of mobile device into a plurality of clusters based on a position estimate of each of the plurality of mobile devices; and
    selecting a cluster including the set of mobile devices, based on the one or more sequencing criteria, wherein at least one sequencing criteria from among the one or more sequencing criteria is based on at least one of a number of mobile devices in the cluster, the quality of channel associated with the number of the mobile devices in the cluster, and a confidence level associated with cluster.

7. The method of claim 1, wherein localizing the first mobile device and the at least a second mobile device comprises receiving respective localization data from the first mobile device and the at least a second mobile device, the localization data comprising one of:
    location coordinates of corresponding mobile device; and
    at least one of sensor data and signal data for localizing the corresponding mobile device.

8. The method of claim 1, wherein the localizing comprises a coordinate location having a probabilistic estimate expressed as a confidence level.

9. A server computing device for localizing a plurality of mobile devices comprising:
    a processor; and
    a memory storing a set of instructions, the instructions executable in the processor to:
    localize a first mobile device and at least a second mobile device of the plurality of mobile devices along a sequence of positions in an indoor route;
    based on one or more sequencing criteria, select the at least a second mobile device for an enhanced channel transmission associated with a received wireless signal; and
    receive, from the at least a second mobile device, corresponding localization data based on the enhanced channel transmission,
    instructions executable in the processor to estimate a confidence level associated with localizing each of the first mobile device and the at least a second mobile device, wherein at least one sequencing criteria from among the one or more sequencing criteria comprises comparing the confidence level associated with localizing the first mobile device with the confidence level associated with localizing the at least a second mobile device, and wherein the at least a second mobile device is selected for the enhanced channel transmission when the confidence level associated with the at least a second mobile device is lower than the confidence level associated with the first mobile device.

10. The server computing device of claim 9, wherein at least one sequencing criteria from among the one or more sequencing criteria is based on at least one of clustering of the plurality of the mobile devices based on a location coordinate of each of the plurality of mobile devices, receipt of a last update from the at least a second mobile device, a motion state of the at least a second mobile device, a user profile associated with the at least a second mobile device and wireless signal parameters associated with the at least a second mobile device.

11. The server computing device of claim 9 further comprising instructions executable in the processor to provide an input to enhance channel transmission for the at least a second mobile device, wherein enhancing the channel transmission comprises focusing a wireless signal in a direction of the at least a second mobile device, based on the localizing of the at least a second mobile device.

12. The server computing device of claim 9 further comprising instructions executable in the processor to, in a subsequent sequencing cycle, select the first mobile device for the enhanced channel transmission.

13. The server computing device of claim 12 further comprising instructions executable in the processor to, identify the subsequent sequencing cycle based on at least one of lapse of a predetermined number of sequencing cycles, a predefined time-period, and the confidence level associated with the first mobile device being less than the threshold confidence level.

14. The server computing device of claim 9 further comprising instructions executable in the processor to, identify a set of mobile devices from among the plurality devices for the enhanced channel transmission, wherein the set of mobile devices includes the at least a second mobile device, and wherein the set of mobile devices is identified by:
 clustering the plurality of mobile device into a plurality of clusters based on a position estimate of each of the plurality of mobile devices; and
 selecting a cluster including the set of mobile devices, based on the one or more sequencing criteria, wherein at least one sequencing criteria from among the one or more sequencing criteria is based on at least one of a number of mobile devices in the cluster, the quality of channel associated with the number of the mobile devices in the cluster, and a confidence level associated with cluster.

15. The server computing device of claim 9, wherein localizing the first mobile device and the at least a second mobile device comprises receiving respective localization data from the first mobile device and the at least a second mobile device, the localization data comprising one of:
 location coordinates of corresponding mobile device; and
 at least one of sensor data and signal data for localizing the corresponding mobile device.

16. The server computing device of claim 9, wherein the localizing comprises a coordinate location having a probabilistic estimate expressed as a confidence level.

* * * * *